US005100102A

United States Patent [19]

Schechter

[11] Patent Number: 5,100,102

[45] Date of Patent: Mar. 31, 1992

[54] COMPACT ELECTRONIC FUEL INJECTOR

[75] Inventor: Michael M. Schechter, Farmington Hills, Mich.

[73] Assignee: Ford Motor Company, Dearborn, Mich.

[21] Appl. No.: 597,660

[22] Filed: Oct. 15, 1990

[51] Int. Cl.[5] .......................... F16K 31/06; B05B 1/32

[52] U.S. Cl. ................................ 251/129.21; 239/585

[58] Field of Search .................... 251/129.21; 239/585

[56] References Cited

U.S. PATENT DOCUMENTS

| | | | |
|---|---|---|---|
| 2,607,368 | 8/1952 | Mayer . | |
| 2,616,955 | 11/1952 | Dube et al. . | |
| 2,637,344 | 5/1953 | Matthews . | |
| 3,018,735 | 1/1962 | Schindler . | |
| 4,524,797 | 6/1985 | Lungu . | |
| 4,564,046 | 1/1986 | Lungu . | |
| 4,582,294 | 4/1986 | Fargo . | |
| 4,601,458 | 7/1986 | Sheppard | 251/129.19 |
| 4,625,919 | 12/1986 | Soma et al. | 251/129.21 X |
| 4,651,931 | 3/1987 | Hans et al. | 251/129.21 X |
| 4,662,567 | 5/1987 | Knapp . | |
| 4,705,324 | 11/1987 | Kervagoret . | |
| 4,715,396 | 12/1987 | Fox . | |
| 4,951,878 | 8/1990 | Casey et al. | 239/585 X |
| 4,971,291 | 11/1990 | Cristiani et al. | 239/585 X |

*Primary Examiner*—Arnold Rosenthal
*Attorney, Agent, or Firm*—Jerome R. Drouillard; Clifford L. Sadler

[57] ABSTRACT

An electronic fuel injector for an internal combustion engine includes an electromagnetic coil assembly and a valve assembly responsive to the coil with the valve assembly including a valve stop having a sealing surface for contacting a valve pintle and a semi-floating pintle reciprocably mounted above the valve stop and having a first axial portion extending within an armature and a second axial portion which is not piloted and which has a sealing surface for contacting the sealing surface of the valve stop.

11 Claims, 1 Drawing Sheet

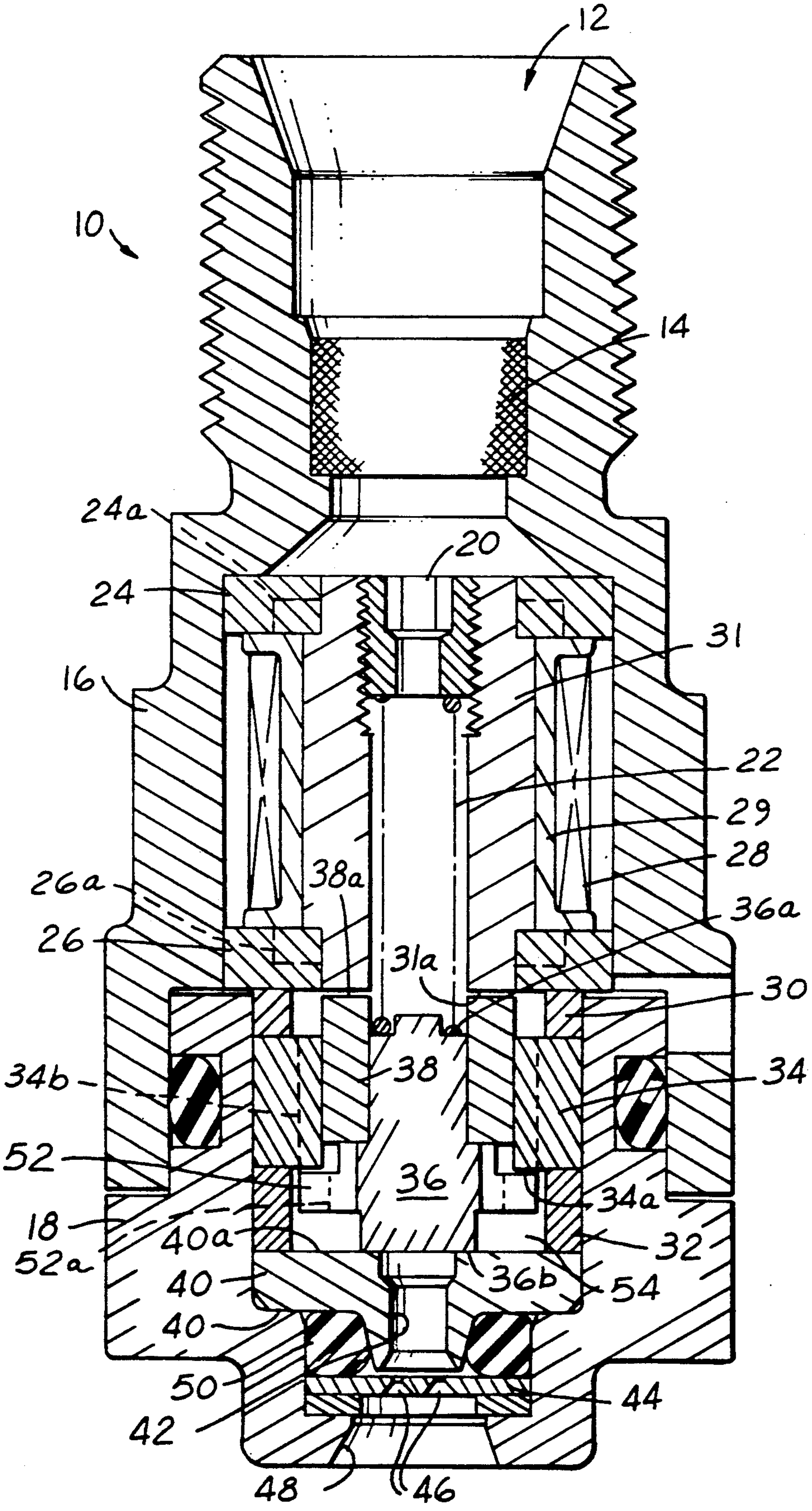
12
10
14
24a
20
24
31
16
22
29
28
26a
38a
36a
26
31a
30
34b
38
34
52
36
34a
18
40a
32
52a
36b
54
40
40
50
44
42
48
46

COMPACT ELECTRONIC FUEL INJECTOR

BACKGROUND OF THE INVENTION

1. Field of the Invention

This invention relates to a reduced size fuel injector for use in internal combustion engines.

2. Disclosure Information

Electronic, or electromagnetically operated, fuel injectors have been used with internal combustion engines for many years. Such injectors typically employ fully-piloted needle valves which are generally elongate in shape and which seal by means of a tapered sealing surface which seats against a concentrically located mating surface situated within the valve body of the injector. This type of configuration is shown generally in U.S. Pat. No. 2,607,368 to Mayer, U.S. Pat. No. 2,616,955 to Dube et al., U.S. Pat. No. 2,637,344 to Matthews, U.S. Pat. No. 4,582,294 to Fargo and U.S. Pat. No. 4,705,324 to Kervagoret. All of these valves suffer from two types of deficiencies. First, the elongate structure of the valve necessitates that the complete injector be of considerable length, which can cause packaging problems if a valve is adapted for use as a fuel injector in certain types of engines. Second, the concentricity requirements of this type of structure demand special consideration during the manufacture of the valves and sometimes leaking, sticking, or other types of unsatisfactory operation result due to manufacturing errors.

U.S. Pat. No. 4,662,567 to Knapp discloses an electromagnetically operable fuel injector having a spherical valve closing member which is guided radially by not only the valve seat but also the valve stop. As alluded to above, such guide structures must be constructed with precision, and therefore, at considerable expense, if the resulting fuel injector must function without leaks at high speeds and feed pressures.

U.S. Pat. No. 4,715,396 to Fox discloses a proportional solenoid valve having a disc shape armature which acts directly upon a valve seat to control flow through the valve. This type of valve is generally not suitable for use as a compact fuel injector for an internal combustion engine because the width of the valve disc will prevent the injector from having a narrow profile.

Finally, U.S. Pat. No. 4,524,797 and U.S. Pat. No. 4,564,046, both to Lungo, disclose solenoid operated valves having permanent magnet armatures which are fully piloted and which have a normally open configuration. The fully piloted construction renders such valves subject to leaking resulting from any lack of parallelism between the sealing surfaces. Further, fuel injectors for engines, on the other hand, with the present fuel injector being no exception, generally employ a normally closed configuration.

It is an object of the present invention to provide an electronically operated fuel injector having a compact package volume.

It is another object of the present invention to provide an electronic fuel injector which is easily manufactured.

It is yet another object of the present invention to provide an electronic fuel injector which does not rely upon the concentricity of the valve group components in order to achieve a leakproof seal.

It is still another object of the present invention to provide an electronic fuel injector which has minimal length and diameter.

It is yet another object of the present invention to provide an electronic fuel injector having low operating friction characteristics, so as to provide superior time response.

Other objects, features, and advantages of the present invention will become apparent to the reader of this specification.

SUMMARY OF THE INVENTION

An electronic fuel injector for an internal combustion engine comprises an electromagnetic coil assembly which is preferably annular in configuration and a valve assembly responsive to the coil, with the valve assembly comprising a valve stop having a sealing surface for contacting a valve pintle. The stop has a bore therethrough for allowing the flow of fuel. The valve assembly further comprises a semi-floating pintle reciprocably mounted above the valve stop and having a first axial portion extending within and rigidly attached to an armature responsive to the coil. The pintle has a second axial portion which is not piloted and which has a sealing surface for contacting the sealing surface of the valve stop. Accordingly, the pintle is semi-piloted. The sealing surfaces of the pintle and valve stop are generally planar and preferably comprise parallel planes. The pintle is urged into contact with the valve stop by an elastic element, preferably a spring. The armature features a non-magnetic coating applied to its outer surface to allow the armature to slide freely within an annular race located within the injector's housing without wearing excessively and without sticking magnetically to the housing. The armature is loosely guided within the annular race. The armature is applied, as noted above, to the pintle such that one part of the pintle is piloted and the other is not. The opening travel of the pintle is limited by a stop flange applied about its outer diameter, it being understood that the pintle comprises a generally cylindrical body with one end adapted to cooperate with the spring for closing the valve and with the other end comprising the valve's second generally planar sealing surface.

The armature preferably comprises a cylindrical body of soft magnetic material having an axial bore for receiving the first axial portion of the pintle and having an outside surface, as noted above, coated with non-magnetic material.

BRIEF DESCRIPTION OF THE DRAWINGS

The single FIGURE incorporated herein is a longitudinal cross-section of a fuel injector according to the present invention.

DETAILED DESCRIPTION OF THE PREFERRED EMBODIMENT

As shown in the FIGURE, an injector, 10, according to the present invention may be made quite compactly. This is a top-feed fuel injector in which fuel is introduced through inlet port 12 and filter 14 at the top of the injector and then flows through a plurality of passages running the length of the injector. Accordingly, fuel flows through passages made in upper coil flange 24, which are illustrated by hidden lines 24*a*. Thereafter, it flows around coil 28 and passes through passages formed in lower coil flange 26, which passages are illustrated by hidden lines 26*a*. After flowing through the inside of upper valve spacer 30 and then through grooves in race 34, as illustrated by hidden lines 34*b*, the fuel flows through slots formed in pintle flange 52, which are illustrated by hidden lines 52*a*. After traversing substantially the entire length of the injector, fuel arrives at annular space 54 in the lower region of the injector, at which time it is ready for injection into the engine through bore 42 contained in valve stop 40 and orifices 46 formed in orifice plate 44.

Starting with the upper part of the injector including upper housing 16, electromagnetic coil 28, which is wound about coil support 29 into an annular configuration, is situated immediately below inlet filter 14. Coil support 29 is spaced axially within upper housing 16 by means of upper coil flange 24 and lower coil flange 26. Upper coil flange 24 is made of soft magnetic material, as are upper housing 16 and lower housing 18. Lower coil flange 26, on the other hand, is made of non-magnetic material to prevent magnetic flux from short-circuiting, and thereby avoiding annular race 34.

Magnetic flux developed by coil 28 travels through the injector upper and lower housings 16 and 18, respectively, and then it travels radially through annular race 34 and into armature 38. From the armature the flux crosses the gap between the armature's upper face 38*a* and opposing face 31*a* of central core 31. The magnetic traction force is generated at this interface. After entering the central core, the flux travels upward through the central core and through upper coil flange 24, to ultimately return to upper housing 16, thus closing the magnetic circuit. The armature comprises a soft magnetic material having an interior bore for accepting pintle 36. The armature may be attached to the pintle by means of pressing, laser welding, or other methods known to those skilled in the art and suggested by this disclosure. The outer diameter of the armature is coated with a non-magnetic material. This coating will perform two functions. First, the coating will improve the durability of the outer surface of the armature, which is a soft material and not inherently abrasion resistant. Second, the coating will prevent the armature from sticking magnetically to the race 34. The thickness of the coating is controlled to minimize operational differences from one injector to another. The coating preferably comprises a composition such as hard chromium, or other types of suitable coatings such as ceramics, known to those skilled in the art and suggested by this disclosure.

Pintle 36 comprises a generally cylindrical body having one end 36*a* adapted to cooperate with closing spring 22 and a second end 36*b* comprising a generally planar sealing surface. In contrast to armature 38, the pintle is preferably constructed of a hard material such as a suitable grade of stainless steel or some other material known to those skilled in the art and suggested by this disclosure.

Travel of pintle 36 is limited in the downward direction by valve stop 40, and in the upper direction by engagement of pintle flange 52 with the lower surface of annular race 34. The axial spacing of the pintle within the injector is set by means of upper valve spacer 30, lower valve spacer 32, and annular race 34. All three of these members spacers generally comprise annular rings which are stacked in the axial space defined by the bottom edge of lower coil flange 26 and the top, or sealing, surface, 40*a*, located on valve stop 40. As may be seen from the Figure, the maximum opening stroke of the pintle is determined by lower valve spacer 32, because changes in the length of spacer 32 allow commensurate changes in the distance the pintle may move from its closed position in contact with surface 40*a* before pintle flange 52 contacts the lower annular surface 34*a* of annular race 34. Taken together, upper valve spacer 30 and annular race 34 determine the distance of the air gap which exists between upper face 38*a* of armature 38 and the lower face of central core 31 when the pintle is in the wide open position.

When coil 28 is energized by the injector driving circuit, which could be part of an electronic engine control or some other device known to those skilled in the art and suggested by this disclosure, magnetic force acting through armature 38 will pull pintle 36 away from contact with valve stop 40 against the force of closing spring 22. At all times, closing spring 22 elastically urges the pintle in the direction of the closed position. The force developed by closing spring 22 is adjustable by means of adjusting screw 20, which is accessible through inlet port 12 once filter 14 has been removed. Those skilled in the art will appreciate in view of this disclosure that other means could be used for elastically urging the pintle into contact with valve stop 40 and that other adjustment means could similarly be employed.

Once pintle 36 has been moved from contact with valve stop 40 by the action of coil 28 and armature 38, pressurized fuel will flow through bore 42 and then through orifices 46, culminating in a spray from the injector. Orifices 46 are contained within orifice plate 44, which may comprise a micromachined silicon structure or other type of discharge orifice known to those skilled in the art and suggested by this disclosure. In any event, leakage of fuel from the injector through the clearance space between orifice plate 44 and lower housing 18 is prevented by O-ring 50, which is interposed between orifice plate 44 and lower surface 40*b* of valve stop 40. Fuel leaving orifices 46 sprays out of the injector, or emanates from the injector, through outlet port 48.

The semi-floating valve feature of the present invention arises from the fact that pintle 36 is piloted only in its region which is inserted into armature 38. The lower part of the pintle extending from armature 38 is not piloted radially in any manner and need not be, because proper sealing of planar surfaces pintle and 40*a* on valve stop 40 requires only that the pintle and valve stop be allowed to come together in a parallel manner. Note that concentricity of the sealing surfaces is not a requirement with an injector according to the present invention. As a result, all that is required is that sealing surfaces 36*b* and 40*a* be lapped to assure a leakproof seal. Further, ease of manufacturing is assured because armature 38 need not have a tight fit within annular race 34, but need only be slidably fitted within the race. As a result, armature 38 need only be loosely guided within annular race 34. The clearance between armature 38 and race 34 is set at a minimum value which will allow a sufficient degree of spatial freedom to assure a leakproof contact between the sealing planes 36*b* and 40*a*. Those skilled in the art will further appreciate that the non-magnetic coating on armature 38 further obviates the need for concentric guide structures of the type found in conventional fuel injectors because the coating will itself prevent the armature from sticking magnetically to annular race 34.

Variations and modifications of the present invention are possible without departing from its spirit and scope as defined by the appended claims.

I claim:

1. An electronic fuel injector for an internal combustion engine, comprising:
   a housing having mating segments;
   an annular electromagnetic coil assembly located within said housing, and having a movable armature associated therewith;
   a valve assembly within said housing and responsive to said coil, with said valve assembly comprising:
   a valve stop having a first generally planar sealing surface for contacting a valve pintle, with said stop also having a bore therethrough for conducting fuel to an orifice plate positioned in the lower end of said injector; and
   a semi-floating pintle reciprocably mounted above said valve stop and having a first axial portion extending within, and rigidly attached to said armature, with said pintle further comprising a second axial portion which is not piloted and which has a second generally planar sealing surface for contacting the first planar sealing surface of said valve stop.

2. An electronic fuel injector according to claim 1, wherein said pintle comprises a generally cylindrical body with one end adapted to cooperate with a spring for closing said valve assembly and another end comprising said second generally planar sealing surface.

3. An electronic fuel injector according to claim 2, wherein said valve assembly further comprises a stop flange applied to said pintle for limiting the opening travel of the pintle.

4. An electronic fuel injector according to claim 1, further comprising an annular race located in said housing between said coil and said valve stop, and with said armature comprising a cylindrical body of soft magnetic material and having a central axial bore for receiving said pintle, and having an outside surface coated with non-magnetic material, with said outside surface being loosely guided within said annular race located.

5. An electronic fuel injector according to claim 5, further comprising a non-magnetic flange interposed between said coil and said annular race.

6. An electronic fuel injector according to claim 6, wherein said pintle is urged into contact with said valve stop by an elastic element.

7. An electronic fuel injector according to claim 6, wherein said elastic element comprises a spring interposed between said pintle and a spring abutment located within said housing.

8. An electronic fuel injector for an internal combustion engine, comprising:
   a housing having mating segments;
   an annular electromagnetic coil assembly located within said housing;
   a substantially flat orifice plate positioned in the lower end of said injector;
   a valve stop having a first generally planar sealing surface for contacting a valve pintle, and a bore therethrough for conducting fuel to said orifice plate;
   a semi-floating pintle reciprocably mounted above said valve stop and having a first axial portion which is piloted, with said pintle further comprising a second axial portion which is not piloted and which has a second generally planar sealing surface for contacting the first planar sealing surface of said valve stop; and
   an armature comprising a cylindrical body of soft magnetic material and having a axial bore for receiving the first axial portion of said pintle, and having an outside surface coated with non-magnetic material, with said outside surface being slidingly engaged with an annular race located within said housing, so that said pintle is semi-piloted during its reciprocating motion.

9. An electronic fuel injector according to claim 8, wherein said pintle comprises a generally cylindrical body with one end adapted to cooperate with a spring for closing said valve assembly and another end comprising said second generally planar sealing surface.

10. An electronic fuel injector according to claim 8, further comprising a non-magnetic flange interposed between said coil and said annular race.

11. An electronic fuel injector according to claim 8, wherein said generally planar sealing surfaces comprise parallel planes.

* * * * *